United States Patent [19]

Feistel

[11] 3,743,957

[45] July 3, 1973

[54] NONINDUCTIVE EQUALIZING NETWORK

[75] Inventor: Karl Heinz Feistel, Eningen, 7412 Eningen, Germany

[73] Assignee: Wandel u. Goltermann, Reutlingen, Germany

[22] Filed: Dec. 3, 1971

[21] Appl. No.: 204,583

[30] Foreign Application Priority Data

Dec. 4, 1970 Germany .................. P 20 59 728.8

[52] U.S. Cl. .................... 330/85, 330/107, 330/151

[51] Int. Cl. ............................................ H03f 1/36

[58] Field of Search .................... 330/107, 109, 151, 330/85, 21; Kerwin et al., "A/

[56] References Cited

UNITED STATES PATENTS 3,636,466 1/1972 Mossberg et al............... 330/107 X

OTHER PUBLICATIONS

Salerno, "Active Filters: Part 7 Analog Blocks Ensure Stable Design," Electronics, Feb. 17, 1969, pp. 100–105.

Kerwin et al. "Active RC Bandpass Filter with Independent Tuning and Selectivity Controls," IEEE Journal of Solid–State Circuits, April 1970, pp. 74, 75.

*Primary Examiner*—Roy Lake
*Assistant Examiner*—James B. Mullins
*Attorney*—Karl F. Ross

[57] ABSTRACT

An equalizing network for correcting phase and amplitude distortions comprises three cascaded operational-amplifier stages, all with grounded noninverting inputs, the first two of them having capacitive feedback to operate as inverting integrators while the third one has a resistive feed-back to function as a summing inverter. The first stage receives on its inverting input, by way of identical resistors, the input voltage and the output voltage of the network and feeds the inverting input of the second stage through an adjustable resistor serving for selection of the frequency of maximum or minimum attenuation. The last-mentioned input also receives the input voltage and the inverted output voltage through respective branches of a potentiometer, serving for adjustment of the attenuation, whose slider is in series with a further adjustable resistor controlling the phase delay. The connection between the potentiometer extremities and the network terminals may include a reversing switch to change the sign of the attenuation.

10 Claims, 7 Drawing Figures

NONINDUCTIVE EQUALIZING NETWORK

My present invention relates to an equalizing network designed to correct phase and/or amplitude distortion in a signaling system serving for the transmission of a board frequency band.

In my prior U.S. Pat. No. 3,568,101 I have disclosed a four-terminal network of this general type essentially designed as an impedance bridge with two adjoining arms constituting different winding sections of an autotransformer subdivided into two subsections with an adjustable turn ratio determining the degree of attenuation to be introduced. The remaining two arms of the bridge include respective resistors which are jointly adjustable to vary the phase shift, with maintenance of a fixed resistance ratio therebetween related to the aforementioned turn ratio. A resonant circuit in one of these latter arms is tunable for the selection of a transmission frequency for which the attenuation reaches a selected maximum value (which could be either positive or negative).

Accurate selection of the maximum attenuation or damping factor requires the use of a properly calibrated inductance as one of the subsections of the autotransformer, this inductance being preferably variable in discrete steps for greater precision. Such calibrated coils are relatively expensive to produce; moreover, the insertion of several such networks in tandem (e.g., within a transmission line to be linearized) requires the interposition of isolating amplifiers between these networks.

In my copending application Ser. No. 178,182, filed Sept. 7, 1971, I have disclosed a simplified network of this description which, while offering almost all the operational advantages of the system disclosed and claimed in my above-identified patent, avoids the need for calibrated transformer windings within the network. In that system, however, an inductance is still required as part of a tunable circuit establishing a resonance frequency $f_o$.

The general object of my present invention is to provide a further improvement in such equalizing network completely eliminating the need for any inductive component, thus allowing their realization by integrated-circuit techniques.

A more particular object is to provide a network of this character using fixed capacitors, all the necessary adjustments being carried out with the aid of variable resistors. These adjustments are the selection of three separately variable parameters, i.e., a median frequency ($f_o$) or the corresponding pulsatance ($\omega_o$), the attenuation or damping factor ($\pm\alpha_o$) associated with that frequency, and the related phase delay or transit time ($T_o$).

These objects are realized, pursuant to the present invention, by the provision of three cascaded operational amplifiers inserted between the input and output terminals of the network, i.e., a pair of integrating stages and a nonintegrating summing stage. One input lead of each operational amplifier is joined to a common input and output terminal of the network held at a fixed potential hereinafter referred to, for convenience, as ground. The other, live input lead of the first (integrating) amplifier is connected through a first and a second resistor to the ungrounded input and output terminals, respectively, of the network. The corresponding input lead of the third (summing) amplifier is connected through a third resistor to the output circuit of the second (integrating) amplifier and through a fourth resistor to the ungrounded input terminal of the network. A fifth resistor is inserted between the output circuit of the first amplifier and the live (ungrounded) input lead of the second amplifier, this lead being connected to the ungrounded input and output terminals of the network through a first and a second resistance path, respectively; the second resistance path, feeding back energy from the network output, is of polarity-inverting character by including an inverter or by being connected to an inverting output of the third amplifier. A control circuit, designed to vary the magnitudes of the resistances of these two paths in a correlated manner, may include a pair of ganged resistors (similar to those shown in my prior patent and application) or, more advantageously, a potentiometer common to both paths to avoid the need for a mechanical linkage. A sixth resistor, common to both paths, enables selection of the delay $T_o$ for the median frequency $f_o$ which in turn is determined by the magnitude of the preferably adjustable fifth resistor. The damping factor $\alpha_o$ is selectable, independently of the delay $T_o$, with the aid of the common control circuit.

More particularly, the grounded input leads of the three amplifier stages are all connected to the noninverting inputs so that these amplifiers operate as inverters.

The use of operational amplifiers in filter networks is known per se, e.g., from an article entitled "Active Filters: Part 7, Analog Blocks Ensure Stable Design" by Joseph Salerno, *Electronics*, Feb. 17, 1969, pages 100–105. Though one of the circuits shown in that article includes three inverting operational amplifiers in cascade, the first two of them being connected as integrators while the third one serves as a summer, that system lacks the aforedescribed control means for jointly varying the magnitude of the resistances of the two paths leading back to the middle amplifier from the input and output terminals of the network, such control means being essential for the purpose of adjusting the damping factor $\alpha_o$ in accordance with the present invention. The system referred to operates only with positive attenuation and, for want of an adjustable resistor common to the two resistance paths, also does not allow any variation in the phase delay $T_o$.

The adjustable sixth resistor of my improved equalizing network, common to the feedback and feed-forward paths, may be connected to the slider of a potentiometer, forming part of the attenuation-adjusting control means, either directly or through the intermediary of an inverting amplifier which in that event is also common to both paths. In order to realize substantial phase delays in such a case, another inverter is then inserted in the feed-forward path. For rapid changeover between positive and negative damping factors, I may provide switch means for selectively reversing the connections between the two potentiometer branches and the respective paths.

The above and other features of my invention will now be described in greater detail with reference to the accompanying drawing in which.

Figure 1:
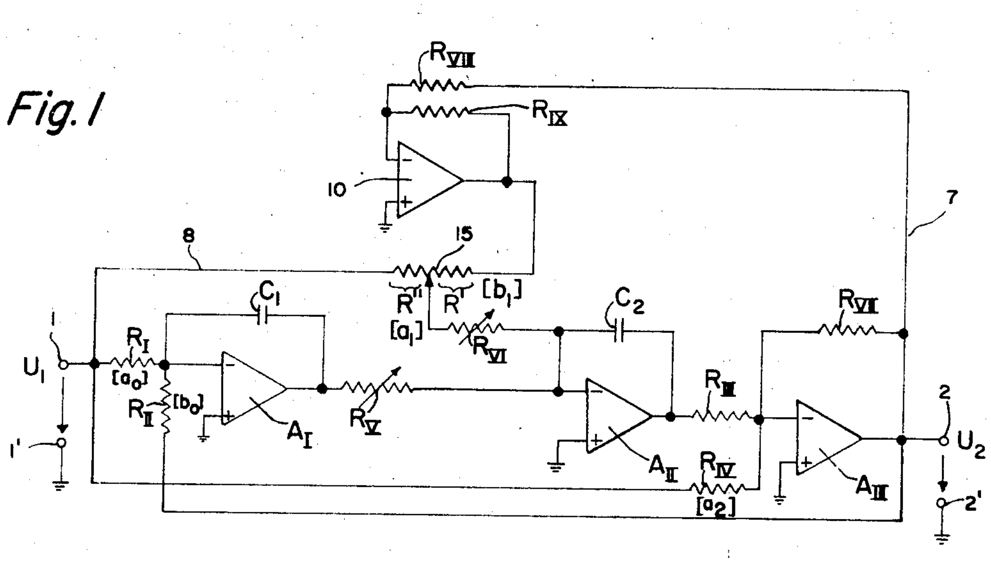
FIG. 1 is a circuit diagram of an equalizing network embodying my present invention.
Figure 2:
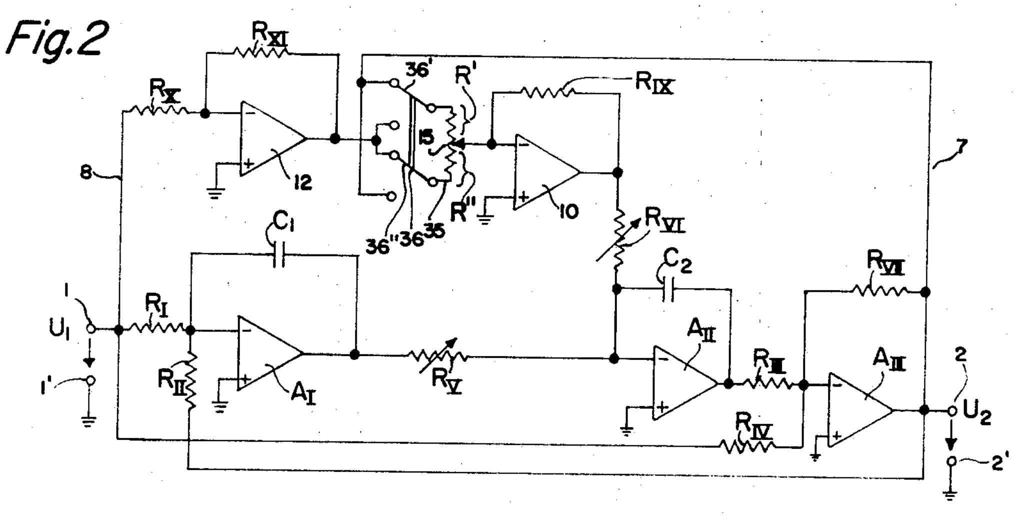
FIG. 2 is a diagram similar to FIG. 1, showing a modification.
Figure 5:
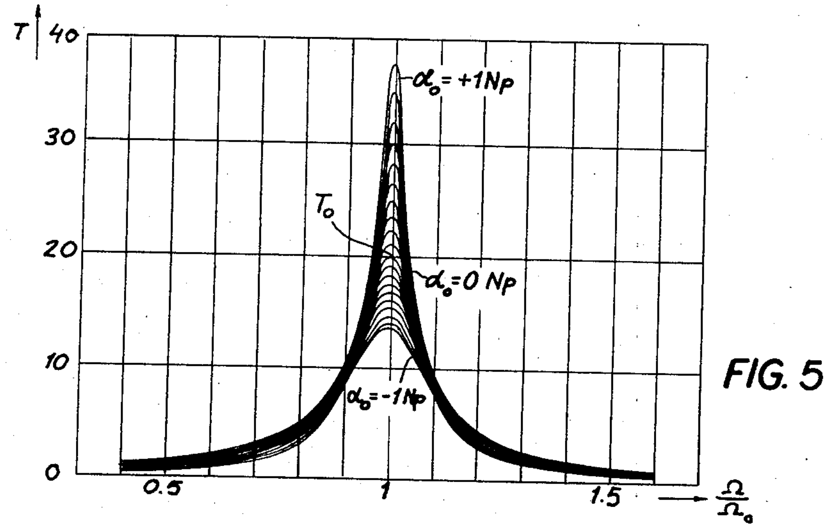
Figure 6:
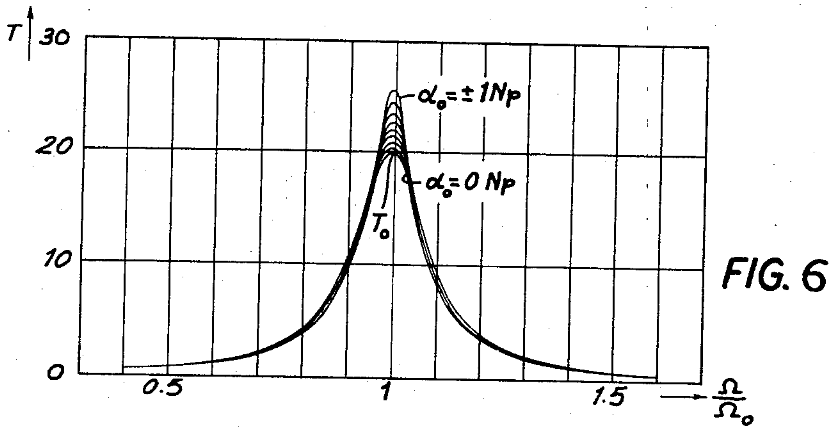
Figure 7:
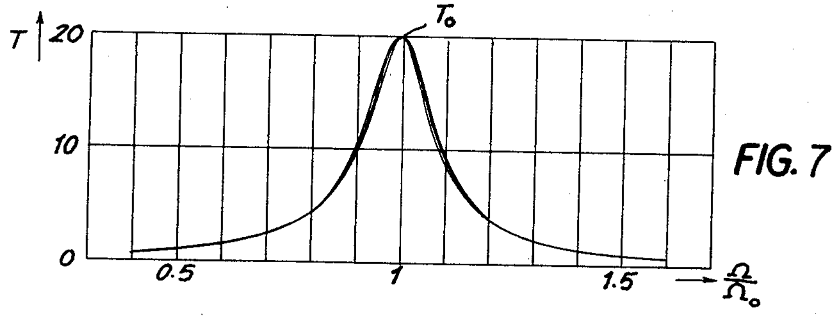

FIGS. 5 and 6 are graphs illustrating the dependency of phase delay on attenuation in a damping network lacking the control means of FIGS. 1 and 2; and FIG. 7 is a graph similar to those of FIGS. 5 and 6 but relating to the operation of the equalizing network shown in FIG. 2.

FIG. 1 illustrates an equalizing network with an active input terminal 1, an active output terminal 2 and a pair of grounded terminals 1', 2' which may be interconnected by a common bus bar (not shown). Three operational amplifiers $A_I$, $A_{II}$ and $A_{III}$ have their noninverting inputs tied to the same grounded bus bar, the inverting input of amplifier $A_I$ being connected to input terminal 1 through a first resistor $R_I$ and to output terminal 2 through a second resistor $R_{II}$. A third resistor $R_{III}$ is inserted between the output of amplifier $A_{II}$ and the ungrounded (inverting) input of amplifier $A_{II}$, the same input being connected through a fourth resistor $R_{IV}$ to terminal 1. An adjustable fifth resistor $R_V$ lies between the output of amplifier $A_I$ and the ungrounded input of amplifier $A_{II}$. The last-mentioned input is further connected through an adjustable sixth resistor $R_{VI}$ to the slider of a potentiometer 15 having two branches R', R'' respectively inserted in a feedback path 7, extending from output terminal 2, and in a feed-forward path 8, extending from input terminal 1.

Feedback path 7 includes a further operational amplifier 10 in series with a resistor $R_{VIII}$ whose magnitude equals that of a feedback resistor $R_{IX}$ of that amplifier which therefore has a gain of −1. A similar feedback resistor $R_{VII}$ associated with amplifiers $A_{III}$ has a magnitude equaling that of resistors $R_{III}$ and $R_{IV}$. The feedback loops of amplifiers $A_I$ and $A_{II}$ contain a pair of capacitors $C_1$, $C_2$ whereby these stages operate as integrators.

FIG. 2 shows a similar network with correspondingly designated components wherein, however, potentiometer 15 is inserted in the feedback path 7 ahead of the inverting amplifier 10 which therefore, together with adjustable resistor $R_{VI}$, lies in a circuit branch common to both paths 7 and 8. The two resistance branches R' and R'' of potentiometer 15 are joined to respective arms 36', 36'' of a reversing switch 36 respectively connecting them, in the illustrated switch position, in paths 7 and 8, thus in a manner analogous to that of FIG. 1. In order to compensate for the polarity inversion introduced by amplifier 10 in the feed-forward path 8 of FIG. 2, the latter includes a further inverting amplifier 12 with a fixed series resistor $R_X$ and a feedback resistor $R_{XI}$ of like magnitude so as to have a gain of −1. It will be apparent that a reversal of switch 36 connects potentiometer branches R' and R'' in paths 8 and 7, respectively.

The overall resistance of potentiometer 15 in the embodiment of FIG. 2 is twice that of resistor $R_{IX}$ whereby, in a position of zero attenuation in which the slider engages the midpoint of the potentiometer, $R' = R'' = R_{IX}$.

The voltages appearing between input terminals 1, 1' and output terminals 2, 2' have been designated $U_1$ and $U_2$, respectively. The relationship between these voltages can be expressed, in general terms, by $$U_2/U_1 = -\ [(a_2\theta^2 + a_1\theta + a_0)/(\theta^2 + b_1\theta + b_0)] \qquad (1)$$

where $a_2$, $a_1$, $a_0$, $b_1$ and $b_0$ are frequency-independent coefficients, $\theta = j\Omega$ being the radius of the circle shown in FIG. 7 of my prior U.S. Pat. No. 3,568,101; in accordance with the symbols used in that prior patent, $\Omega = \omega/\omega_r$ with $\omega_4 = 2\pi f_r$ where $f_r$ is an arbitrarily selected reference frequency.

The positive or negative peak attenuation $\alpha_o$, occurring at a median frequency $f_o$ (which corresponds to a pulsatance $\omega = \omega_o$ and an operating variable $\Omega = \Omega_o$), is given by the equation $$\alpha_o = \log_e |b_1/a_1| \qquad (2)$$

The corresponding phase delay $T_o$ can be expressed by $$T_o = 2[(1/b_1) - (1/a_1)], \qquad (3)$$

this value generally deviating but little from the peak of the delay curve as will be apparent from FIG. 4 discussed hereinafter.

In FIG. 1 the coefficients of equation (1) have been inserted in brackets next to the components determining same. Thus, coefficients $a_0$, $a_1$ and $a_2$ are respectively determined by the magnitude of resistors $R_I$, $(R'' + R_{VI})$ and $R_{IV}$; coefficients $b_0$ and $b_1$ depend on the values of resistors $R_{II}$ and $(R' + R_{VI})$, respectively.

In the network illustrated in FIGS. 1 and 2 the coefficient $a_2$ of equation (1) is 1 in view of $R_{IV} = R_{VII}$ while $a_0 = b_0$ on account of $R_I = R_{II}$. The transfer function $U_2/U_1$ can then be rewritten as follows:

$$\frac{U_2}{U_1} = -\frac{\theta^2 - \dfrac{R_{VII}}{\omega_r C_2 R_{III} R''\left(\dfrac{1}{R_{VI}} + \dfrac{1}{R'} + \dfrac{1}{R''}\right)}\theta + \Omega_o^2}{\theta^2 + \dfrac{R_{VII}}{\omega_r C_2 R_{III} R'\left(\dfrac{1}{R_{VI}} + \dfrac{1}{R'} + \dfrac{1}{R''}\right)}\theta + \Omega_o^2} \qquad (4)$$

where $$\Omega_o^2 = R_{VII}/\omega_r^2 C_1 C_2 R_I R_{III} R_V = a_0 = b_0 \qquad (5)$$

From equation (2) we find $$\alpha_o = \log_e |R''/R'| \qquad (6)$$

The near-maximum phase delay, from equation (3), becomes $$T_o = 2\,\frac{\omega_r C_2 R_{III}\,(R' + R'')}{R_{VII}}\left(1 + \frac{R' + R''}{R'R''}\,R_{VI}\right) \qquad (7)$$

It will thus be seen that the peak attenuation $\alpha_o$ is independent of the setting of resistor $R_{VI}$ which controls the delay $T_o$. This delay, on the other hand, is not completely independent of the selected value of $\alpha_o$, as more fully discussed below.

The adjustability of resistor $R_V$ enables the shifting of the point of peak attenuation $\alpha_o$ and the corresponding phase delay $T_o$ to different median frequencies $f_o$. This follows from equation (5) according to which, with $R_{VII} = R_{III}$, $$\omega_o^2 = 1/C_1 C_2 R_I R_V \qquad (8)$$

Thus, $\omega_o$ and therefore $\Omega_o$ can be varied by adjusting $R_I$ and/or $R_V$. Adjustment of resistor $R_I$ would, however, also require a concurrent adjustment of $R_{II}$ in order to maintain the relationship $a_0 = b_0$; hence, I prefer to make only resistor $R_V$ adjustable.

It will be apparent that, in the system of FIG. 1, inverter 10 may be omitted if feed-back path 7 originates at another output of amplifier $A_{III}$ carrying the voltage $-U_2$.

In the system of FIG. 2, in which again $a_2 = 1$ and $a_0 = b_0$, the magnitudes of coefficients $a_1$ and $b_1$ are given by $$a_1 = -(R_{VII} R_{IX}/R_{III} \omega_r C_2 R_{VI} R'') \qquad (9)$$

and $$b_1 = R_{VII} R_{IX}/R_{III} \omega_r C_2 R_{VI} R' \qquad (10)$$

The phase delay of the network of FIG. 2 can be expressed by the formula $$T_o = 2[(R_{III}\omega_r C_2)/(R_{VII} R_{IX})]\ (R' + R'')\ R_{VI} \qquad (11)$$

The peak attenuation $\pm\alpha_o$ is again exclusively determined by the ratio $R'/R''$ in accordance with equations (2), (9) and (10). For the undamped condition $\alpha_o = 0$, therefore, the slider of potentiometer 15 occupies a midposition in which $R' = R''$.

Equation (11) also shows that with elimination of the inverter 12, which reverses the sign of one of the two potentiometer branches $R'$, $R''$, $T_o$ is reduced to 0 in the midposition of the slider, with minimum phase delays throughout the band of operating frequencies (cf. curve T' in FIG. 11 of my U.S. Pat. No. 3,568,101) so that the system operates as an all-pass network.

Figure 3:
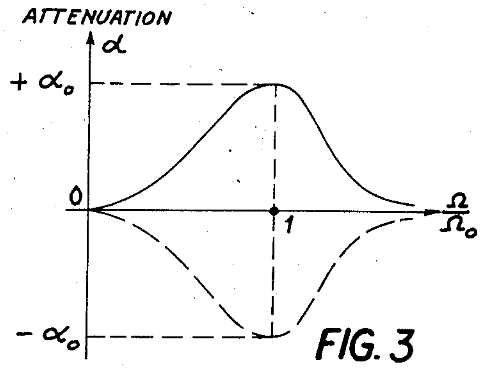
FIGS. 3 and 4 represent graphs of attenuation and phase shift in a system according to FIG. 1 or 2, plotted over a range of operating frequencies.
Figure 4:
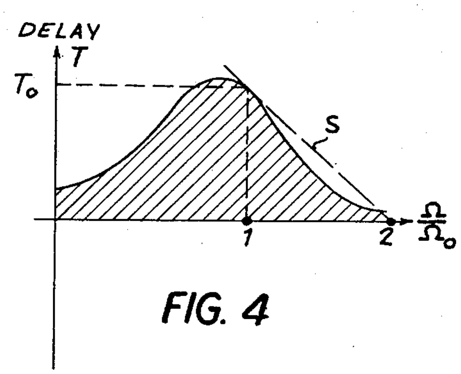

In FIGS. 3 and 4 I have indicated the variation of attenuation $\alpha$ and delay T as a function of the relative frequency $f/f_o = \Omega/\Omega_o$. Each of these functions will be seen to approximate a Gaussian curve, the negative values of $\alpha$ having been shown in dotted lines.

To equalize the transmission characteristics of a communication channel, generally with the aid of several cascaded equalizing networks operating in different frequency bands, the attenuation $\alpha$ of each network should first be reduced by 0 by centering the slider of potentiometer 15 whereupon the individual phase delays may be adjusted (with the aid of resistor $R_{VI}$) to compensate for the overall delay of the channel throughout the frequency range of interest. Since the attenuation is independent of the setting of resistor $R_{VI}$, its value does not change during this adjustment. Upon the subsequent resetting of the several potentiometers to provide a uniform damping factor throughout the range, the selected phase delay is modified only slightly in a system corresponding to my invention.

If, in the system of FIG. 2, the adjustment of the attenuation $\alpha_o$ expressed by equation (6) were carried out by varying only one of two separate resistors replacing the two potentiometer branches, e.g., a resistor equivalent to branch $R''$, the delay T would vary with frequency in the manner illustrated in FIG. 5, i.e., along a family of curves applying to different peak attenuations $\alpha_o$. In that Figure the damping factor $\alpha_o$ ranges, in increments of 0.1 neper, between +1 Np and −1 Np. It will be seen that the median delay $T_o$, selected at 20 for $\alpha_o = 0$, ranges between about 38 for $\alpha_o = +1$ Np and about 13 for $\alpha_o = -1$ Np.

If the separate resistors determining the coefficients $a_1$ and $b_1$ were so coupled as to maintain a constant difference $b_1 - a_1$, the family of curves shown in FIG. 6 would result. According to the latter figure, with $T_o$ again having the value 20 for $\alpha_o = 0$, this value rises to about 25 for both $\alpha_o = +1$ Np and $\alpha_o = -1$ Np.

In the system shown in FIG. 1, in which $R' + R''$ is constant, equation (7) shows that the delay $T_o$ is even less dependent upon the selected attenuation, i.e., upon the ratio $R''/R'$. This dependency can be minimized through the choice of a small enough value for $R_{VI}$, with corresponding reduction of $T_o$. In the extreme case in which $R_{VI} = 0$, a substantial delay $T_o$ could still be realized through suitable choice of the overall potentiometer resistance $R' + R''$. Even with small values of $R' + R''$ and a large resistance $R_{VI}$, however, the dependency of the delay $T_o$ upon attenuation is at worst equal to that shown in FIG. 6.

In the system of FIG. 2 the constancy of the sum $R' + R''$ results in an attenuation-independent median delay $T_o$ according to equation (11); this corresponds to a constancy of the difference $(1/b_1) - (1/a_1)$ in equation (3).

FIG. 7 illustrates this independence of the delay $T_o$ which for all potentiometer settings retains its chosen value of 20. At the point $T_o$, which does not exactly coincide with the peak of the curve $T(\Omega/\Omega_o)$, the curve has a slope S (FIG. 4) that is constant for all values of $\alpha_o$. Different damping factors result only in minor shifting of the curve flanks, as seen in FIG. 7, with the area beneath the curve (shaded in FIG. 4) remaining constant.

The reversing switch 36 of FIG. 2, which evidently could also be included in the system of FIG. 1, may be used for rapid switchovers between positive and negative damping factors without changes in phase delay.

It will be noted that the networks of FIGS. 1 and 2, like those disclosed in my copending application Ser. No. 178,182, have output amplifiers enabling them to be connected directly to the input side of a similar network without interposition of an active isolating stage.

I claim:

1. An equalizing network comprising:

an input terminal, an output terminal and a common terminal;

a first, a second and a third operational amplifier connected in cascade between said input and output terminals, said first and second amplifiers being connected as integrators, said third amplifier being connected as a summer, each of said amplifiers having an output circuit, a live input lead and another input lead connected to said common terminal;

a first resistor inserted between said input terminal and the live input lead of said first amplifier;

a second resistor inserted between said output terminal and the live input lead of said first amplifier;

a third resistor inserted between the output circuit of said second amplifier and the live input lead of said third amplifier;

a fourth resistor inserted between said input terminal and the live input lead of said third amplifier, the output circuit of the latter being connected to said output terminal;

a fifth resistor inserted between the output circuit of said first amplifier and the live input lead of said second amplifier;

a noninverting first resistance path extending from said input terminal to the live input lead of said second amplifier;

a polarity-inverting second resistance path extending from said output terminal to the live input lead of said second amplifier, said resistance paths being provided with control means for jointly varying the magnitudes of their respective resistances while holding the sum of said magnitudes constant; and an adjustable sixth resistor common to both said resistance paths.

2. A network as defined in claim 1 wherein said amplifiers all have inverting inputs connected to said live input leads thereof.

3. A network as defined in claim 2 wherein said first and second resistors are of the same magnitude.

4. A network as defined in claim 3 wherein said third amplifier is provided with a feedback resistor of the same magnitude as said fourth resistor.

5. A network as defined in claim 2 wherein said second resistance path includes an inverting fourth operational amplifier in series with said sixth resistor and provided with an inverting input connected to said output terminal.

6. A network as defined in claim 5 wherein said control means comprises a potentiometer with first and second branches respectively included in said first and second resistance paths.

7. A network as defined in claim 6 wherein said fourth amplifier is inserted between said output terminal and the second branch of said potentiometer.

8. A network as defined in claim 7 wherein said potentiometer has a slider connected through said sixth resistor to the live input lead of said second amplifier.

9. A network as defined in claim 6 wherein said potentiometer has a slider connected to the inverting input of said fourth amplifier, said second branch being con-nected to said output terminal, further comprising an inverting fifth operational amplifier inserted between said input terminal and said first branch.

10. A network as defined in claim 6, further comprising a reversing switch connected to said potentiometer for interchanging the connection of said branches in said first and second resistance paths.

* * * * *